Nov. 14, 1967  G. L. WILDE ETAL  3,352,114
MOUNTING MEANS FOR SEPARATELY SUPPORTING A GAS TURBINE
ENGINE AND A JET PIPE IN AN ENGINE POD
Filed March 3, 1966  3 Sheets-Sheet 3

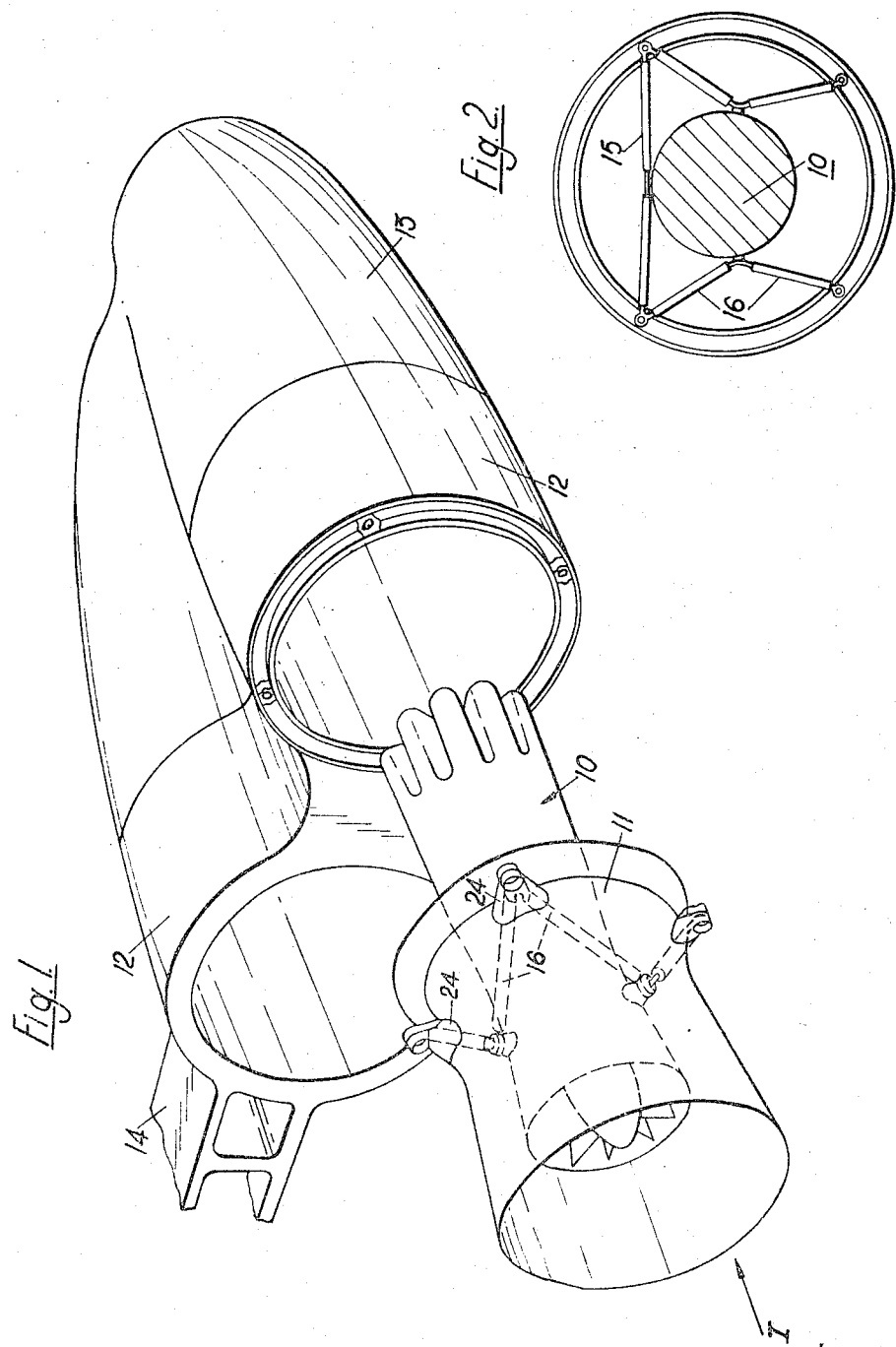

Inventors
GEOFFREY LIGHT WILDE
PETER ARTHUR WARD
WILLIE WILLIAMSON
By CHARLES BARKER
Cushman, Darby & Cushman
Attorney United States Patent Office 3,352,114
Patented Nov. 14, 1967

3,352,114
MOUNTING MEANS FOR SEPARATELY SUPPORTING A GAS TURBINE ENGINE AND A JET PIPE IN AN ENGINE POD
Geoffrey Light Wilde, Cowers Lane, and Peter Arthur Ward, Willie Williamson, and Charles Barker, Derby, England, assignors to Rolls-Royce Limited, Derby, England, a British company
Filed Mar. 3, 1966, Ser. No. 531,554
Claims priority, application Great Britain, July 17, 1965, 30,461/65
5 Claims. (Cl. 60—262)

ABSTRACT OF THE DISCLOSURE

An improved mounting means for removably suspending a gas turbine engine and a jet pipe assembly in an aircraft structure includes a cylindrical monocoque structure within which the engine is suspended. The cylindrical monocoque structure is provided with annular I-beam members at its front and rear extremities for receiving struts from which the gas turbine engine and its jet pipe are suspended. A front I-beam member supports the gas turbine engine, and a rear I-beam member supports the jet pipe assembly.

---

This invention relates to engine mounting structures and is concerned with an improvement or modification of the invention described in the provisional specification of co-pending application S.N. 531,553, filed March 3, 1966, and owned by the assignee of this invention.

According to the present invention an aircraft engine mounting structure comprises two axially spaced apart annular members adapted to be connected to aircraft structure, the engine being supported within the structure whereby the engine loads are transmitted thereto.

Preferably a first means is provided to connect the engine to the front annular member and to support all the engine loads therefrom and second means are provided to attach the jet pipe to the rear annular member.

Also preferably the said first means comprises a framework of tubular members.

According to another embodiment of the present invention an aircraft engine mounting structure comprises two axially spaced apart annular members adapted to be attached to aircraft structure and within which a first engine is supported, two further axially spaced apart annular members each of which is attached to one of the first two such members for mounting a second adjacent engine, the common longitudinal axis of said further members being substantially parallel to the common longitudinal axis of the first two members.

The invention will now be described in more detail, merely by way of example, with reference to the accompanying drawings in which:

FIGURE 1 is a pictorial view of a double engine pod showing one engine and a mounting structure of the present invention.

FIGURE 2 is a view of the direction of arrow 1 of FIGURE 1 at the plane of attachment of the engine showing one engine only.

Figure 3:
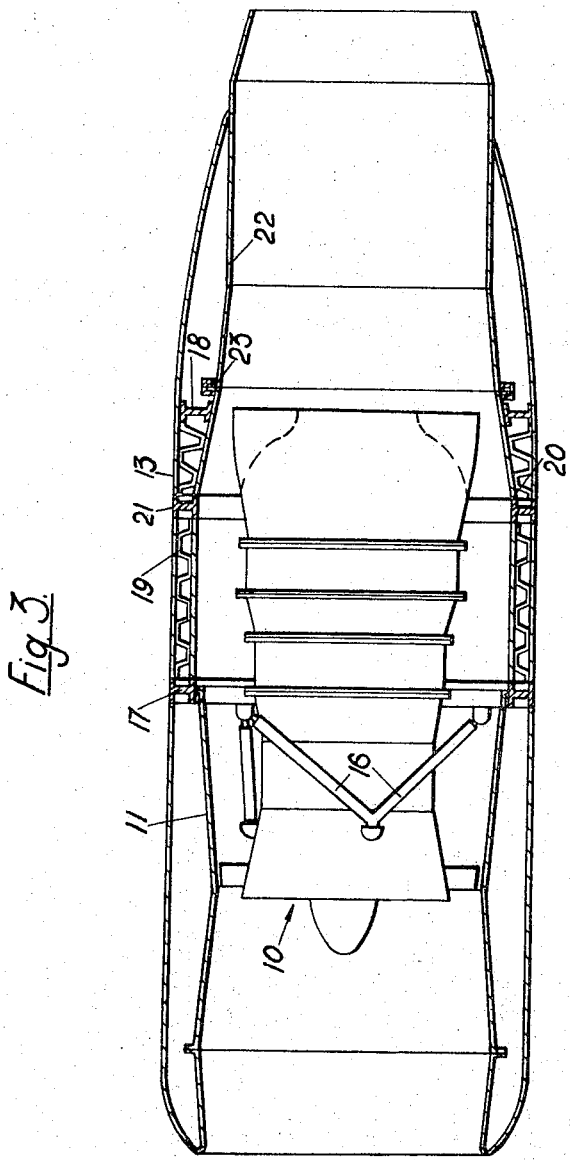
FIGURE 3 is a sectional elevation of an engine mounted in an aircraft in accordance with the present invention.

With the mounting means of the present invention the engine is attached to the mounting structure by one mounting means and at points in one plane, and the jet pipe, thrust reversers and associated accessories are attached to the mounting structure at points in another plane so that for the purposes of servicing the aircraft the engine can be removed alone from the aircraft leaving the jet pipe etc. attached. Similarly the jet pipe etc. can be removed while leaving the engine in position.

An advantage of this arrangement is that the actual engine turbine rear casing does not have to carry the weight of the jet pipe etc. Thus the engine casing does not have to be strengthened to take the extra weight and can be made lighter.

Still a further advantage is that the engine is mounted from points at or near its center of gravity and is thus mounted further forward in the aircraft pod at a point where there is more room for the engine accessories to be buried in the by-pass duct, if desirable.

Referring now to the drawings there is shown in FIGURE 1 is a bypass gas turbine engine having an engine 10 and bypass duct 11. A mounting structure 12 is shown forming part of an aircraft double engine pod 13 which is attached to an aircraft fuselage at a position 14. The invention will hereinafter be restricted to a description of a single engine mounted within the structure.

The engine is attached to the mounting structure by a framework 15 of tubular members 16 which are bolted to the front part of the mounting structure. The framework extends substantially around the engine 10 as shown in FIGURE 2.

The mounting structure comprises two annular beams 17, 18 of I-section as shown in FIGURE 3, the said beams being connected by a portion of cylindrical section 19.

The cylindrical section 19 comprises an inner wall and an outer wall with a monocoque structure in between, as described in application Number 531,553, and the inner wall forms part of the bypass duct of the engine itself.

In the embodiment shown, the inner wall of the cylindrical portion is angled at the point 20 where it begins to taper towards the jet pipe and a third I-beam 21 may be formed in the mounting structure to strengthen the structure at the point where the inner wall changes slope.

The jet pipe 22 of the engine is attached to the rear beam at 23 by bolts or in any other convenient manner so that it is detachable separately from the mounting structure 12 and is not attached to the engine.

The engine 10 is attached to the mounting structure 12 by means of the framework 15. The framework 15 consists of 6 tubular members 16 which are attached to the engine 10 at three points around the periphery of the engine and is attached to the front annular member at four points.

The bypass casing is built up with a plurality of housings 24, one at each position at which a tubular member 16 projects through the bypass casing, and sealing means are provided within the housings to prevent the bypass air escaping to atmosphere.

Figure 4:
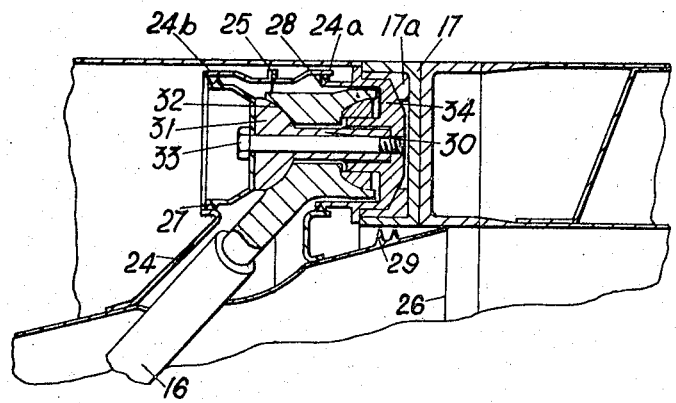
FIGURE 4 is an enlarged sectional view of a housing which contains one joint of the tubular mounting frame with front annular member.

FIGURE 4 is an enlarged view of one of the housings and the sealing means contained therein.

The housings 24 may be made integrally with the bypass casing or may be attached thereto by welding or in any other convenient manner. Each housing 24 is made in two portions 24a and 24b which are joined at a flange 25 and the bypass casing is split at 26 so that the tubular members 16 can be assembled on the engine prior to being bolted to the member 17.

Labyrinth seals are provided at 27, 28 and 29 to prevent the bypass air escaping.

When the engine is being assembled in the aircraft, the front portion of the housing is fitted into the upstream annular recess 17a of the annular I-beam 17. The framework 15 is then fitted to the engine and finally the rear portion of the housing is bolted with the tubular framework to the front portion of the housing by the bolt 30.

The bolt 30 is hollow and has a part-spherical head portion 31 which locates in a part-spherical seat 32. The bolt 30 is the main engine mounting bolt and a second bolt 33 passes through the hollow stem of the bolt 30 and screws into a seat 34 to retain the sealing means 27.

Figure 5:
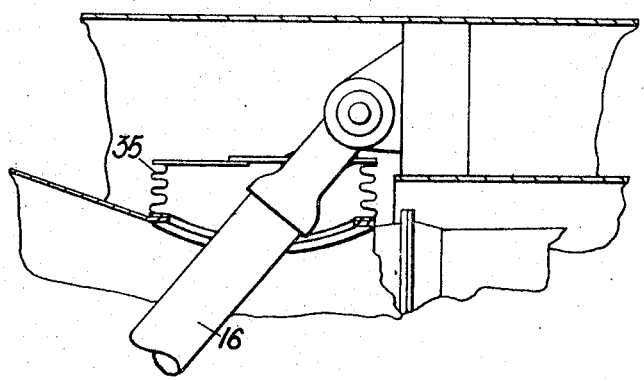
FIGURE 5 is a view of a further embodiment in which the inner radial portion of the housing of FIG. 4 is flexible.

The housing 24 may comprise a flexible portion 35 as shown in FIG. 5 which is in the form of a bellows which may be rubber or thin metal and which also acts as a seal between the bypass casing and the housing 24. Such a bellows would allow a certain amount of flexibility in the mounting and would be capable of withstanding any vibration loads or torsional loads set up during the running of the engine.

As described in the provisional specification of co-pending application S.N. 531,553 this further embodiment of the invention hereinbefore described may also be used to mount a single engine in an underwing pod and also as described in the said specification the engine accessories may be designed inside a fairing in the bypass duct.

We claim:

1. An improved mounting means for hanging and suspending a gas turbine engine and a jet pipe assembly therefor within an engine pod comprising:
   a substantially cylindrical casing member being coextensive with and forming a part of said engine pod, said cylindrical casing member being of monocoque construction and including annular beam members at its front and rear extremities for carrying the gas turbine engine and jet pipe loads, respectively,
   a first plurality of strut means attached to said gas turbine engine, and a second plurality of strut means attached to said jet pipe,
   means for removably attaching said first plurality of strut means, and the gas turbine engine carried thereby, to the beam member at the front extremity of said cylindrical casing member, and
   separate means for removably attaching said second plurality of strut means, and the jet pipe assembly carried thereby, to the beam member carried at the rear extremity of said casing member, whereby said gas turbine engine and said jet pipe assembly can be separately removed from the engine pod for maintenance or replacement.

2. An aircraft engine mounting structure according to claim 1 and in which the gas turbine engine (to be mounted) is a bypass engine and the inner wall of said cylindrical casing member forms part of the outer wall of the bypass passage of the gas turbine engine.

3. An aircraft engine mounting structure according to claim 1 and in which each annular beam member is provided with an extension which extends at least partially around a second adjacent engine.

4. An aircraft engine mounting structure according to claim 3 and in which the extensions of the annular beam members are of arcuate form.

5. An aircraft engine mounting structure according to claim 3 and in which the extensions are formed as integral portions of the annular beam members.

References Cited

UNITED STATES PATENTS

| | | | |
|---|---|---|---|
| 2,516,671 | 7/1950 | Bowers et al. | 60—39.31 X |
| 2,529,955 | 11/1950 | Morley | 248—5 |
| 2,580,207 | 12/1951 | Whittle | 60—39.32 X |
| 2,640,317 | 6/1953 | Fentress | 60—39.31 X |
| 2,663,517 | 12/1953 | Price | 60—262 X |
| 2,880,574 | 4/1959 | Howald | 60—39.31 |
| 3,020,004 | 2/1962 | Blyth et al. | 60—39.31 X |
| 3,028,124 | 4/1962 | Sammons | 244—54 |
| 3,095,166 | 6/1963 | Briggs | 60—39.31 X |
| 3,105,355 | 10/1963 | Bruder | 60—39.31 X |

FOREIGN PATENTS

| | | |
|---|---|---|
| 967,640 | 11/1950 | France. |
| 714,252 | 10/1941 | Germany. |
| 744,473 | 2/1956 | Great Britain. |
| 339,499 | 10/1959 | Switzerland. |

CARLTON R. CROYLE, *Primary Examiner.*